3,789,014
YTTRIUM PHOSPHATE VANADATE PHOSPHOR
Eugene A. Graff, Cedar Grove, and Herman R. Heytmeijer, Whippany, N.J., assignors to Westinghouse Electric Corporation, Pittsburgh, Pa.
Filed June 14, 1972, Ser. No. 262,870
Int. Cl. C09k 1/36, 1/44
U.S. Cl. 252—301.4 P                                    7 Claims

ABSTRACT OF THE DISCLOSURE

A method for improving the red luminescence and total luminescence of rare-earth metal activated yttrium phosphate vanadate phosphor using acid milling. The fired phosphor is milled in an acid solution. The use of acid during the milling provides an improved phosphor as compared to a water milling followed by the normal water or basic rinse, and even provides an improvement over water milling followed by an acid rinse. Preferably the acid used is either citric or hydrochloric. There is also provided the phosphor with the improved surface characteristics which is the product of this process.

BACKGROUND OF THE INVENTION

Solid solutions of rare-earth metal phosphate and rare-earth metal vanadate are known in the art. These phosphors find particular application in color-corrected high pressure mercury vapor discharge lamps.

Yttrium phosphate vanadate phosphors have been prepared by mixing ingredients in stoichiometric proportions and firing the mixed ingredients. Alternately, doped yttrium phosphate and doped yttrium vanadate have been separately precipitated and then mixed together and fired as described in copending application Ser. No. 3,403, filed Jan. 16, 1970 by Richard C. Ropp and issued as Pat. No. 3,661,791 on Aug. 14, 1972 and owned by the present assignee. In either case the fired phosphors have been milled in water, and then rinsed in a water or basic solution.

Similar methods have been used in the treatment of other phosphors. In U.S. Pat. No. 2,691,601, issued Oct. 12, 1954 to Butler et al., an acid rinse treatment is described for halophosphate phosphors. As the halophosphate phosphor itself is soluble in the acid, the mode of cleaning thought to be provided by such an acid rinse is the dissolving of the fine particles of the phosphor from the surfaces of the larger particles of phosphor. The foregoing process of removing the "fines" is widely used to increase the brightness of halophosphate phosphors.

As rare-earth metal activated yttrium phosphate vanadate phosphors are generally used in high pressure mercury vapor discharge lamps, an important parameter of the phosphor is its red luminescence, as a relatively large amount of red luminescence is required to color correct the mercury vapor discharge. The red lumens have been measured by measuring the visible emissions above approximately 610 nm emitted by a lamp. The visible emissions passing through a Corning filter No. 2418 can be used for such measurements. Yttrium phosphate vanadate phosphors prepared by the normal method of water milling the fired phosphor followed by a hot water or caustic wash, has when used in one type of high pressure mercury discharge lamps shown approximately 20,000–21,000 total lumens and when measured in the above-described manner approximately 3300–3400 red lumens.

SUMMARY OF THE INVENTION

It has been discovered that the red luminescence and the total luminescence of rare-earth metal activated yttrium phosphate vanadate phosphors can be increased by milling the fired phosphor in an acid-water solution. This acid milling minimizes contamination on the phosphor particle surfaces. After acid milling the phosphor for a period of at least five minutes, the residual acid is removed from the phosphor.

Preferably the acid in the acid-water solution is either a chelator type or an acid whose anionic radical is both univalent and nonoxidizing or is readily volatilized at a temperature of less than about 200° C. whereby surface contamination on the final phosphor is minimized.

BRIEF DESCRIPTION OF THE DRAWINGS

For a better understanding of the invention, reference should be made to the accompanying drawings wherein.

DESCRIPTION OF THE PREFERRED EMBODIMENTS

Figure 1:
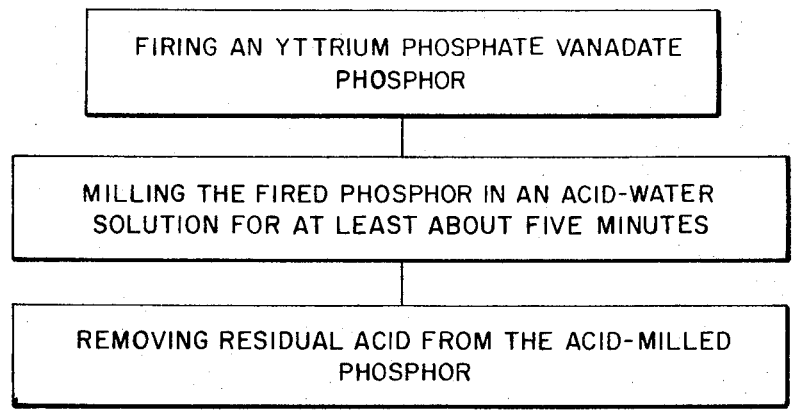
FIG. 1 is a flow diagram illustrating steps of preparing a phosphor with improved liminescence.

With reference to FIG. 1, there is shown a flow diagram of steps in producing an improved yttrium phosphate vanadate phosphor using the steps of acid milling and of removing residual acid in accordance with this invention. It should be noted that this is an acid treatment as compared to the normal water treatment or water milling followed by a rinse which have been used heretofore in the preparation of yttrium phosphate vanadate phosphors. Further it should be noted that this is not a process of dissolving the "fines" as is done for example with halophosphate phosphors. Unlike the halophosphate phosphors, the yttrium phosphate vanadate phosphor is not soluble in the acid and this is not a treatment for dissolving the "fines." Instead this process is thought to be the removal of contamination resulting from excess flux, which contamination is bonded to the phosphor particle surfaces. When sodium vanadate or sodium hdyroxide has been used for the flux, for example, spectrographic analysis has shown, sodium, together with a trace amount of yttrium and vanadium, in the effluent from the acid milling. Further, X-ray crystallographic measurements indicated presence of sodium chloride and sodium metavanadate in the effluent.

While acids such as nitric, sulfuric and acetic provide some improvement in luminescence, phosphors which are prepared by acid milling in those acids do not provide as much improvement as acid milling in hydrochloric or citric for example. The lesser improvement provided by nitric, sulfuric and acetic acids is thought to be due to the surface contamination of the final phosphor by the anionic radicals of these acids, whereas, when a chelator type acid such as citric acid is used, surface contamination by the acid radical is effectively prevented. Similarly the use of an acid whose anionic radical is both univalent and non-oxidizing or is readily volatilized at temperature less about 200° C., permits the removal of the surface contamination on the final phosphor. Non-oxidizing type acids have been used for rinsing phosphors, oxidizing type acids have been used for rinsing phosphors, including for example, halophosphate phosphors as noted in U.S. Pat. 2,691,-601, issued Oct. 12, 1954 to Butler et al. In the present invention, it is also thought that to be desirable, that the acid's anionic radical be univalent as, being less strongly adsorbed, they are more easily removed. This, together with the possibility of volatizing the hydrogen chloride, is thought to explain the excellent performance of hydrochloric acid.

Figure 2:
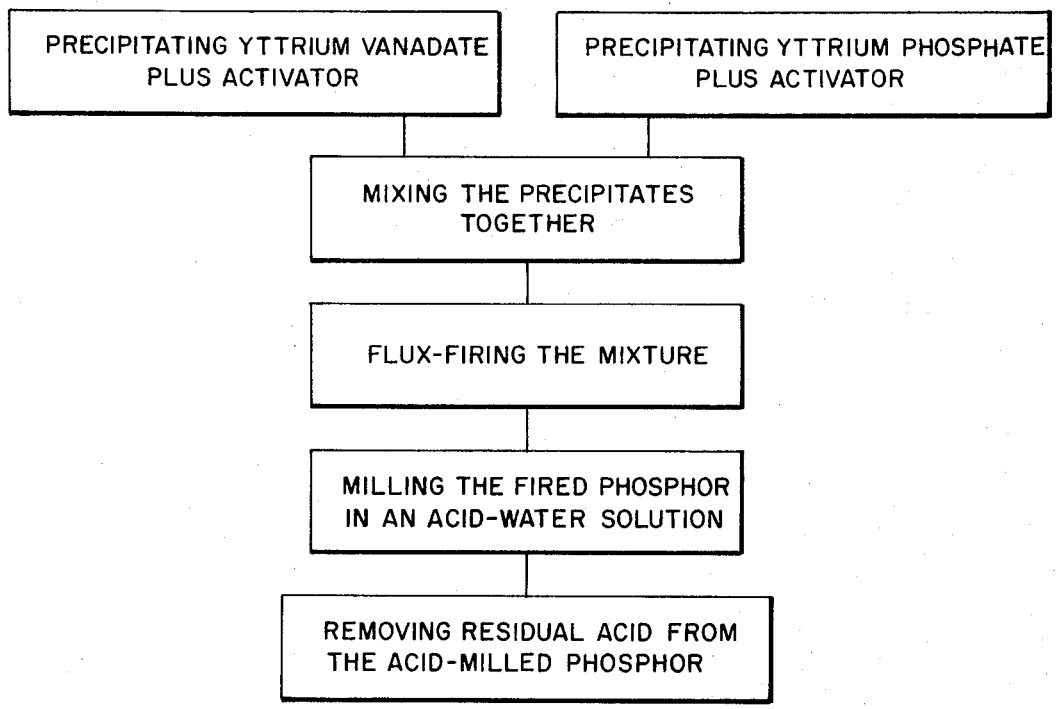
FIG. 2 is a flow diagram illustrating an embodiment in which yttrium vanadate and yttrium phosphate are separately precipitated prior to mixing and firing.

FIG. 2 illustrates an embodiment in which the yttrium vanadate and the yttrium phosphate are separately precipitated, mixed together, and flux fired. The acid milling of the present invention has proved especially successful in removal of the flux contamination which results from this process. Tests have shown that the use of hydrochloric or citric acid milling has improved the total lumens from the 21,000–22,000 range to a range of 23,500–24,500 and the critical red lumens from 3300–3400 to approximately 4150–4450. Improvements were also provided by the use of nitric, sulfuric and acetic acid milling, and acid milling of phosphors produced by stoichiometric mixtures of phosphor ingredients, rather than separately precipitating yttrium phosphate and yttrium vanadate, but these improvements were less dramatic and lower total lumens and red lumens were obtained.

After acid milling the residual acid is removed from the phosphor. This can be by a series of water rinses which are continued until the effluent from the rinsing process has reached some predetermined pH. It has been found that pH's of greater than 4.5 are satisfactory, however, the optimum pH is between 6.3 and 7.0. It is convenient to carry out the rinsing process in a centrifuge, as the centrifuge provides for easy removal of most of the rinse water. Rinses other than water, for example, an ammonium hydroxide-water solution, can also be used.

The following examples illustrate this invention:

Example I

The following ingredients are added to a 27 gallon U.S. Stoneware (Norton Co.) ball mill series No. 564 containing a 50% charge (approximately 240 pounds) of Burundum cylindrical grinding media (3/16 inches O.D. by 13/16 inches length); 21.0 kilograms of fired phosphor, and a solution of 27.2 liters of deionized water and 4.3 liters of hydrochloric acid. The mill is operated at 40 r.p.m. for about 60 minutes. The mill is then rinsed with 87.7 liters of deionized water and the slurry is transferred to a hundred gallon tank. The slurry is then stirred for approximately 20 minutes and allowed to settle for at least 30 minutes. Then at least 17 gallons of liquor are decanted. An equivalent volume of deionized water is then added, slurried for about 20 minutes and allowed to settle for at least 30 minutes. Again 17 gallons of liquor are decanted and an equal volume of deionized water is added. The slurry is then stirred for 20 minutes and the tank contents pumped into a centrifuge. The powder is continually washed in the centrifuge and the pH of the effluent monitored. When the pH reaches 6.3 the centrifuge cake is loaded into drying trays and dried overnight at 100° C. to 140° C.

Example II

Similarly, acid-milled phosphor can be obtained by the procedure of Example I, but using a 10% by weight HCl solution and milling for 5 minutes.

Example III

An acid-milled phosphor can be obtained by the procedures specified in Example I but using 30 liters of a 2% by weight solution of citric acid in place of the 27 liters of deionized water and 4.3 liters of hydrochloric acid and running the mill for 240 minutes.

Example IV

Acid-milled phosphor can also be obtained by the procedure as specified in Example III but using a 10% by weight solution of citric acid and milling for about 60 minutes.

In addition to the variations given in the above examples, it has been found that the speed of the ball mill can be varied in a range of 30 to 60 r.p.m., the time for ball milling can be varied from about 5–240 minutes. Other chelator type acids, for example, diethylene-triamine-pentacetic acid, can be used. The chelator type acids and hydrochloric acid can both be used in 2–10% by weight solutions. Other types of acid-milling, for example, milling by feeding phosphor in an acid solution through a hammer mill can be used, and other rinsing methods, for example hot water rinsing can be used. The particular type of mill and the grinding media are not critical.

Although, in the past, such phosphors have normally been washed after milling in a water or basic solution, some improvement is given by following a water mill with an acid rinse (followed then by water rinses). The instant invention of acid milling unexpectedly provides additional advantages in red lumens and total lumens over separately milling and acid rinsing. Experiments have shown that with regard to the critical red lumens, water milling with a water wash produces slightly over 3000 red lumens, the water milling followed by an acid wash produces slightly over 3500 red lumens, and acid milling produces over 4000 red lumens.

The advantages of the acid milling have also been shown by X-ray defraction studies. The product of the instant process can be discerned from product of the prior art processes in that an intensity pattern with sharp lines is obtained from the product of the instant process which has minimized surface contamination. Conversely, the product of the prior art process, having surface contamination such as sodium or boron from the flux, produces an X-ray diffraction pattern which does not have sharp lines.

We claim as our invention:

1. The method of treating a fired, rare-earth metal activated yttrium phosphate vanadate phosphor to minimize contamination on the phosphor particle surfaces and thereby increase its red luminescence and total luminescence, which method comprises milling said fired phosphor in an acid-water solution for a period of at least about five minutes, and thereafter removing residual acid from said phosphor.

2. The method of claim 1, wherein the acid-water solution is either a chelator type or an acid whose anionic radical is both univalent and non-oxidizing or is readily volatilized at a temperature less than about 200° C.

3. The method of claim 1, wherein said acid is either citric acid or diethylene-triamine-pentacetic acid in a 2–10 percent by weight solution, whereby surface contamination by acid radicals is effectively prevented.

4. The method of claim 3, wherein said acid is citric acid.

5. The method of claim 2, wherein said acid solution is a 2–10% solution by weight of hydrochloric acid.

6. The method of claim 2, wherein said milling comprises ball milling for about 5–240 minutes.

7. The method of claim 2, wherein said yttrium phosphate vanadate phosphor is initially prepared, prior to said milling, from separately precipitated yttrium vanadate plus activator and yttrium phosphate plus activator and said precipitates are mixed together and then flux-fired to produce said yttrium phosphate vanadate.

References Cited

UNITED STATES PATENTS

| 3,505,241 | 4/1970 | Mathers | 252—301.4 R |
| 3,647,706 | 3/1972 | Lagos | 252—301.4 R |
| 3,661,791 | 5/1972 | Roop | 252—301.4 P |

OSCAR R. VERTIZ, Primary Examiner

J. COOPER, Assistant Examiner

U.S. Cl. X.R.

252—301.4 R